(12) United States Patent
Park

(10) Patent No.: US 6,913,121 B2
(45) Date of Patent: Jul. 5, 2005

(54) AUXILIARY SYSTEM FOR AN AUTOMOBILE PARKED ON A SLOPE

(75) Inventor: Sung-Ho Park, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/300,125

(22) Filed: Nov. 19, 2002

(65) Prior Publication Data

US 2003/0111901 A1 Jun. 19, 2003

(30) Foreign Application Priority Data

Dec. 18, 2001 (KR) .......................................... 2001-80655

(51) Int. Cl.[7] .............................................. F16D 65/36
(52) U.S. Cl. ....................................... 188/156; 74/535
(58) Field of Search ............................... 74/536, 502.2, 74/535, 537, 538; 188/2 D, 72.1, 72.9, 156, 157

(56) References Cited

U.S. PATENT DOCUMENTS

| | | | |
|---|---|---|---|
| 4,212,211 A | * | 7/1980 | Rickert .......................... 74/538 |
| 4,295,540 A | | 10/1981 | Hildebrecht |
| 4,561,527 A | | 12/1985 | Nakamoto et al. |
| 5,154,250 A | | 10/1992 | Murai |
| 5,178,237 A | * | 1/1993 | Ursel et al. ..................... 74/538 |
| 5,243,856 A | * | 9/1993 | Yamazaki et al. ............. 74/538 |
| 5,272,935 A | * | 12/1993 | Heinemann et al. .......... 74/523 |
| 5,575,448 A | | 11/1996 | Battocchio |
| 5,927,735 A | | 7/1999 | Hosoda |
| 6,631,796 B2 | * | 10/2003 | Yanaka et al. ............ 192/219.4 |

* cited by examiner

Primary Examiner—Xuan Lan Nguyen
Assistant Examiner—Melanie Torres
(74) Attorney, Agent, or Firm—Morgan Lewis & Bockius LLP

(57) ABSTRACT

An auxiliary system for an automobile parked on a slope that automatically releases the parking brake at an appropriate time when the automobile is restarted, thereby preventing the automobile from rolling backward or stalling, and enabling the driver to proceed smoothly and stably.

2 Claims, 4 Drawing Sheets

AUXILIARY SYSTEM FOR AN AUTOMOBILE PARKED ON A SLOPE

FIELD OF THE INVENTION

The present invention relates to an auxiliary system for an automobile parked on a slope, and more particularly, to such a system adapted to prevent the automobile from rolling backward when the automobile is re-started on the slope and to prevent the engine from stalling.

BACKGROUND OF THE INVENTION

Generally, in an automobile having a manual transmission, a driver must pay attention to the manipulation of the brake pedal and accelerator to prevent the automobile from rolling backward when restarting the automobile on a slope. But inexperienced drivers, who are not accustomed to restarting a vehicle when it is parked on a slope, may experience difficulty in manipulating the pedals and the vehicle may roll backward or the engine may stall, and this may cause an accident.

An experienced driver can manipulate the parking brake so that the vehicle does not roll backward when the vehicle is parked on a slope; releasing the parking brake when they desire the vehicle to move. But this maneuver is difficult, since the driver must control the accelerator pedal, and clutch pedal, while releasing the parking brake by hand.

SUMMARY OF THE INVENTION

The present invention provides an auxiliary system for an automobile that is adapted to automatically release a parking brake at an appropriate time when the automobile is parked and restarted on a slope. The invention prevents the automobile from rolling backward or prevents the engine from stalling, thus enabling the driver to perform a stable and smooth start.

In accordance with an embodiment of the present invention, an auxiliary system for an automobile parked on a slope comprises a base plate and a parking lever hinged to the base plate for pulling a parking cable by way of rotary manipulation. A latch plate is rotatably mounted at the base plate for co-operating with a manipulating rod mounted at the parking lever to maintain a rotating state of the parking lever. A manipulating system changes the rotating state of the latch plate and a control system controls the manipulating system for a period of time according to the manipulation of an operation switch and acceleration pedal by a driver.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
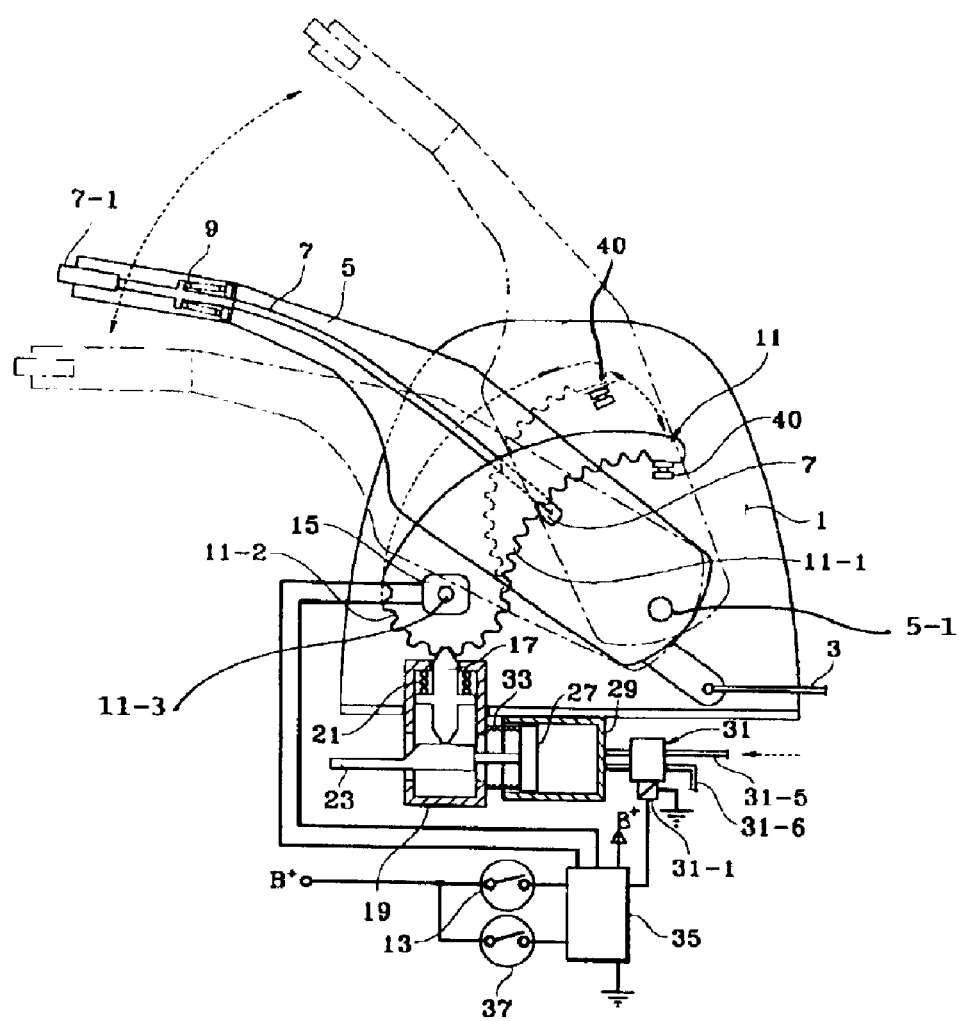
FIG. 1 is a schematic view illustrating an auxiliary system for an automobile parked on a slope according to the present invention.

As shown in FIG. 1, an auxiliary system for an automobile parked on a slope according to an embodiment of the present invention includes a base plate 1 and a parking lever 5 hinged to the base plate 1 for pulling a parking cable 3 by way of rotary manipulation. The parking lever 5 is mounted with a manipulation rod 7 and rotates about a pivot 5-1 in response to manipulation by a driver.

The manipulating rod 7 protrudes from one end of the parking lever 5 and is equipped with a button part 7-1 for a driver to press by hand. When the driver presses and releases the button part 7-1, the button part 7-1 is returned to its original position due to a rod spring 9 installed inside the parking lever 5. The manipulating rod 7 is formed at the other end to be meshed with an arch-shaped latch portion at a latch plate 11 (described below). A stopper 40 is secured at the base plate 1 for restricting the rotation of the latch plate 11.

The latch plate 11 is rotatably mounted to the base plate 1 and cooperates with the manipulating rod 7 to maintain the rotary state of the parking lever 5. The latch plate 11 is formed with an arched-shaped latch portion 11-1 that cooperates, meshes, or "hitches", with the manipulating rod 7 and thereby maintains the rotary position of parking lever 5. Also, the latch plate is equipped with a round latch part 11-2 that is notched at a radius from rotary shaft 11-3 about which latch plate 11 pivots. Normally, the latch plate 11 remains meshed with the manipulating rod 7 and the parking brake is operated and released by manipulation of the parking lever 5 and button part 7-1 by the driver.

In an embodiment of the invention, when a vehicle is stopped and restarted on a slope, the latch plate 11 is rotated to release the meshed state between latch plate 11 and the manipulating rod 7, thus the parking brake is released without the driver having to manipulate the parking lever 5. Furthermore, this auxiliary system for an automobile starting parked on a slope includes a manipulating system for changing the rotary state of the latch plate 11, and a control system for controlling the manipulating system for a period of time in response to manipulation of a manipulation switch 13 and acceleration pedal by a driver, which toggles acceleration pedal switch 37.

The manipulating system includes a motor 15 for turning the rotary shaft 11-3 of the latch plate 11 and fixing system for meshing with the round latch part 11-2 to fix the position of the latch plate 11. The fixing system preferably comprises a locking member 17, slideably mounted and linearly moveable, for meshing with the round latch part 11-2 at the latch plate 11; a locking housing 19 for guiding the slidable linear movement of the locking member 17; a support spring 21, mounted between the locking housing 19 and the locking member 17, for resiliently supporting the locking member 17 and for urging the locking member 17 from the round latch part 11-2; a cam member 23, for switching the meshed state of the locking member 17 with the round latch part 11-2 by moving in the direction perpendicular to the moving direction of the locking member 17 while contacting the locking member 17; and a fluid pressure system for activating cam member 23.

Figure 3:
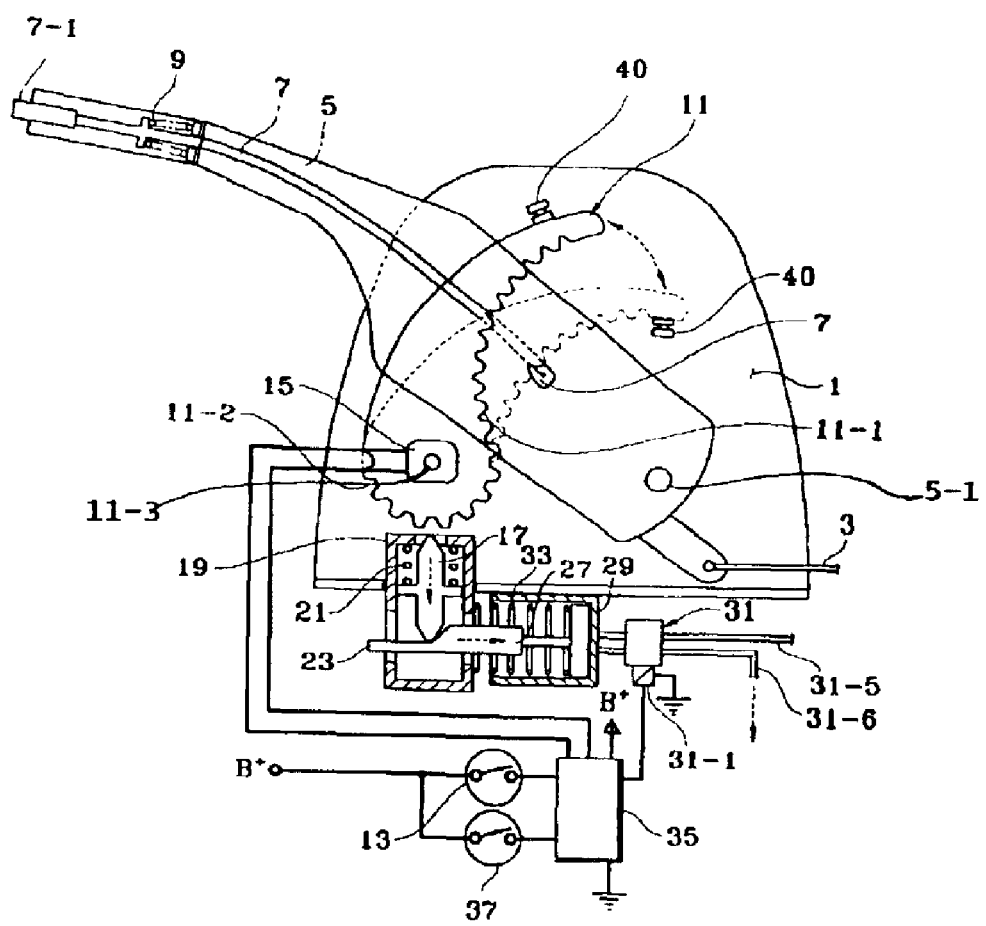
FIG. 3 is a schematic structural view illustrating the operational state of an auxiliary system for an automobile parked on a slope according to the present invention.

As shown in FIGS. 1 and 3, the cam member 23 is formed at an upper surface thereof with a cam curvature. This cam causes locking member 17 to mesh with notches on the round latch part 11-2 of the latch plate when cam member 23 is moved to the left. Cam member 23 allows the locking member 17 to retract, urged by the support spring 21, and unmesh from the round latch part 11-2, when cam member 23 is moved to the right.

The spring 33 may also be located on the other side of piston 27, with the supply and discharge lines 31-3, 31-4 similarly moved and the control logic charged, so that, should air pressure cylinder 29 lose pressure, spring 33 would force cam member 23 to the left, maintaining the meshed state between locking member 17 and round latch part 11-2. The fluid pressure system includes: a piston 27 connected to the cam member 23 via a rod; an air pressure cylinder 29, mounted to guide a slidable linear movement of the piston 27; an air pressure valve 31, mounted with a solenoid actuator 31-1, for supplying and discharging the compressed air to and from the air pressure cylinder 29 in response to an electrically manipulated signal; and a discharging spring 33, mounted resiliently in the direction of the piston 27, for discharging the air in the air pressure cylinder 29. The structure and operation of the air pressure valve 31 will be described with reference to FIGS. 2 and 4. The air pressure valve 31 includes a valve housing 31-2. A first supply tube 31-3 and a first discharge tube 31-4 connect from the valve housing 31-2 to the air pressure cylinder 29. The fluid pressure system may use oil as an operation medium but in the present embodiment, compressed air is used as the operation medium. A second supply tube 31-5, receives the compressed air from a compressor or an air pressure tank (not shown) while a second discharge tube 31-6 connected to the atmosphere. A valve spool 31-8, slidably mounted within the valve housing 31-2 and formed with a communicating groove 31-7 at a periphery thereof, switches the communicating state between the first supply tube 31-3 and the second supply tube 31-5 and between the first discharge tube 31-4 and the second discharge tube 31-6. A solenoid actuator 31-1 generates a magnetic force when electricity is supplied thereto for pulling the valve spool 31-8 so that a flow path is established between the first discharge tube 31-4 and the second discharge tube 31-6. Finally, a return spring 31-0 resiliently supports the valve spool 31-8 so that when electricity is not supplied to the solenoid actuator 31-1, the valve spool 31-8 returns to its original position, establishing a flow path from the first supply tube 31-3 to the second supply tube 31-5.

Returning to FIG. 1, the control system in the present embodiment for controlling the motor 15 and the solenoid actuator 31-1 may be formed by an electronic control unit 35. The electronic control unit 35 receives an input signal from an operation switch 13 that is manipulated by the driver when the driver stops and starts an automobile on a slope. Control unit 35 also receives an input signal from the acceleration pedal switch 37 that toggles between on or off in response to whether or not the driver is applying the accelerator. Control unit 35 may comprise a processor and memory with associated hardware and software as may be selected and programmed by a person of ordinary skill in the art to execute the control functions described herein.

When signals from the two switches 13 and 37 are provided, the electronic control unit 35 first actuates the solenoid actuator 31-1 to release the meshed state between the locking member 17 and the round latch part 11-2 at the latch plate. Subsequently, the electronic control unit 35 drives the motor 15 and rotates the latch plate 11, thereby releasing the meshed state between the arched latch part 11-1 and the manipulating rod 7. After a period of time, the electronic control unit 35 reverses the direction of the motor 15 to rotate the latch plate 11 to its original position. Electronic control unit also cuts off the power supplied to the solenoid actuator 31-1 so that the locking member 17 is meshed with the round latch part 11-2 of the latch plate to fix the latch plate 11.

The period of time should be long enough so that the latch plate 11 may rotate, releasing the meshed state between the arched latch part 11-1 and the manipulating rod 7, and the parking lever 5 may rotate counterclockwise (on the drawing), releasing the parking brake. But the period of time should be short enough so that motor plate 15 rotates the latch plate 11 back to its original position before the driver attempts to operate the parking lever 5 again under normal vehicle-running conditions.

The operation switch 13 is turned on only when the driver manipulates it. But, when switch 13 is manipulated by the driver, the electronic control unit registers this as turning on the operation switch 13 for a period of time, e.g., 5 seconds. The control unit maintains a "switch 13 on" flag for 5 seconds regardless of how long the driver manipulated it. The electronic control unit 35 then determines whether the motor 15 and the solenoid actuator 31-1 are actuated, for the period of time, according to whether the acceleration pedal switch 37 has been turned on for another period of time. Of course, one of ordinary skill in the art will realize the operation switch 13 may be a type that is continually in the ON state for a period of time, in contrast to the abovementioned style. Also, although not shown, electronic control unit 35 may consider whether a clutch switch is toggled, indicating whether or not the clutch is engaged, when determining whether or not to activate motor 15 and solenoid actuator 31-1.

The operation of an embodiment of the present invention is as follows. Under normal use of the parking brake, the latch plate 11 is fixed by the locking member 17 and the round latch part 11-2. When a driver presses the button part (7-1) of the manipulating rod 7 they may adjust the rotating state of the parking lever 5 and this pulls or releases the parking cable 3 to activate or release the parking brake. Normally, when a vehicle is stopped on a slope, the driver pulls the parking lever 5 to activate the parking brake in order to maintain the stopped state. According to an embodiment of the invention, with the parking brake activated, when the driver presses the operation switch 13, steps on the acceleration pedal for a period of time, and manipulates the clutch pedal to start, while the brake pedal is not being manipulated, the parking brake is released at an appropriate time by the invention, thereby allowing the vehicle to begin moving smoothly.

In other words, the electronic control unit 35, in response to the manipulation of the operation switch 13 and acceleration pedal thus described, determines whether all of the signals are received from the operation switch 13 and the acceleration pedal switch 37 supplies power to the solenoid actuator 31-1. Then, the solenoid actuator 31-1 pulls the valve spool 31-8, allowing a flow path from the first discharge tube 31-4 and the second discharge tube 31-6. This forms an outlet so that the compressed air can be discharged from the air pressure cylinder 29 to the atmosphere. The discharge spring 33 forces the piston 27 to discharge the compressed air from the air pressure cylinder 29. Consequently, the cam member 23 moves to the right (on the drawing), forming the state illustrated in FIG. 3.

As the cam member 23 is moved, support spring 17 forces the locking member 17 to move downwards. Thus, the locking member 17 retracts from the round latch part 11-2 so that the latch plate 11 can be rotated. The electronic control unit 35 then drives the motor 15 to rotate the latch plate 11 counterclockwise. This releases the meshed state between the arched latch part 11-1 and the manipulating rod 7. As a result, tension in the parking cable rotates the parking lever 5 and the force of the brake return spring (not shown) releases the parking brake.

Thus, the vehicle is started by driver manipulation of the acceleration pedal and clutch pedal and the parking brake is automatically released. This allows the vehicle to begin moving smoothly so that the driver can stably and smoothly start the vehicle without the difficulty encountered when swiftly manipulating the acceleration pedal and the clutch pedal while simultaneously manipulating the parking lever 5 by hand.

Once the vehicle starts to move, after a period of time, the electronic control unit 35 reverses the rotation of the motor 15. This forces the latch plate 11 to return to its original position. Electronic control unit 35 also cuts off power to the solenoid actuator 31-1 to fix the latch plate 11, once it has returned to the original position.

Figure 2:
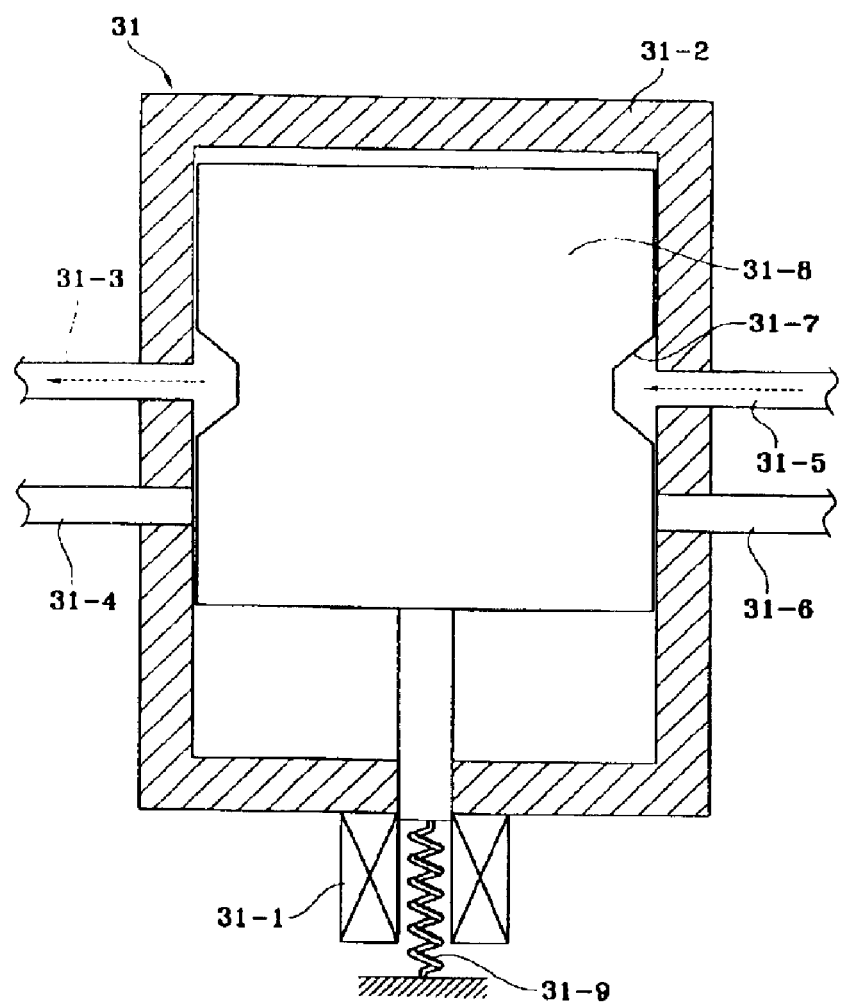
FIG. 2 is a cross-sectional view illustrating the structure of an air pressure valve illustrated in FIG. 1.
Figure 4:
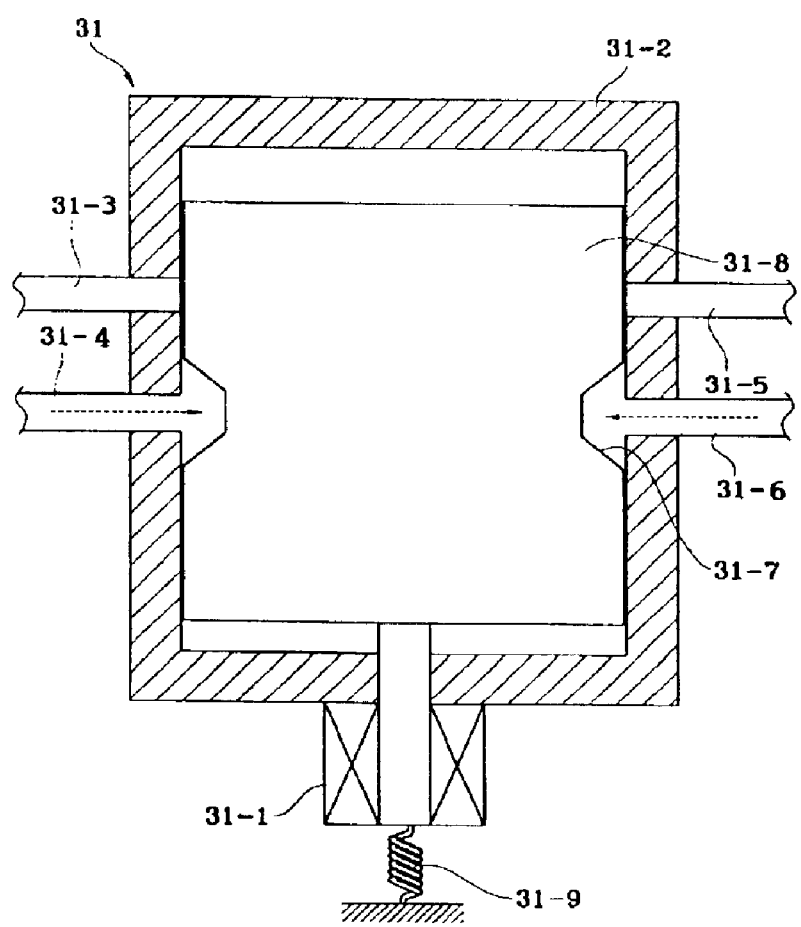
FIG. 4 is a cross-sectional view illustrating the operational state of an air pressure valve shown in FIG. 3.

Referring briefly to FIGS. 2 and 4, when power is cut off from the solenoid actuator 31-1 and the latch plate 11 returns to its original position, the valve spool 31-8 moves upwards via the return spring 31-9 creating a flow path between first supply tube 31-3 and the second supply tube 31-5 communicates therebetween, adding compressed air to the air pressure cylinder 29. Now returning to FIGS. 1 and 3, this causes the piston 27 to compress the discharge spring 33 and to move the cam member 23 to the left as shown in FIG. 1. In concert with this motion by cam member 23, the locking member 17 moves upwards to mesh with the round latch part 11-2 of the latch plate, thereby fixing the latch plate 11.

At this point, the driver may again rotate the parking lever 5 to operate the parking brake while also using the button part 7-1 of the manipulating rod. During the predetermined time that latch plate 11 is rotated away from manipulating rod 7, however, button part 7-1 is not functional. But, at all times, the driver may pull parking lever 5 to actuate the parking brake.

As described in the foregoing, there is an advantage for an automobile parked on a slope in an auxiliary system, that automatically releases the parking brake at an appropriate time, preventing the automobile from rolling backward or from stalling and thereby enabling the driver to proceed smoothly and stably.

What is claimed is:

1. An auxiliary system for an automobile, the system comprising:
   a base plate;
   a parking lever hinged to the base plate for pulling a parking cable by way of rotary manipulation;
   a latch plate, rotatably mounted at said base plate, for cooperating with a manipulating rod mounted at the parking lever to maintain the rotated state of said parking lever;
   a manipulating system for changing the rotating state of the latch plate, said manipulating system comprising a motor; and
   a control system for controlling the manipulating system for a period of time according to the manipulation of an operation switch and an acceleration pedal, said control system comprising an electronic control unit (ECU);
   wherein said latch plate comprises:
   an arch-shaped latch portion formed to create a hitched state with the manipulating rod at said parking lever; and
   a round latch portion formed at a rotary shaft of said latch plate;
   wherein the manipulating system further comprises a fixing system for meshing with the round latch portion of said latch plate to constantly maintain the rotated state of said latch plate;
   and said motor provides a turning effect to the rotary shaft of said latch plate; and
   wherein the fixing system comprises:
   a locking member mounted in a slidable and linearly movable fashion for switching the meshed state of said round latch part at said latch plate;
   a locking housing for guiding the linear movement of the locking member;
   a support spring, mounted between the locking housing and said locking member, that resiliently supports said locking member while said locking member is retracted from said round latch part;
   a cam member that contacts with said locking member and moves in the direction perpendicular to the moving direction of said locking member, thereby switching the meshed state between said locking member with said round latch part and
   a fluid pressure system for sliding the cam member.

2. An auxiliary system for an automobile, the system comprising:
   a base plate;
   a parking lever hinged to the base plate for pulling a parking cable by way of rotary manipulation;
   a latch plate, rotatably mounted at said base plate, for cooperating with a manipulating rod mounted at the parking lever to maintain the rotated state of said parking lever;
   wherein said latch plate comprises an arch-shaped latch portion formed to create a hitched state with the manipulating rod at said parking lever, and a round latch portion formed at a rotary shaft of said latch plate;
   a manipulating system for changing the rotating state of the latch plate, said manipulating system comprising a motor;
   wherein the manipulating system further comprises a fixing system for meshing with the round latch portion of said latch plate to constantly maintain the rotated state of said latch plate and said motor provides a turning effect to the rotary shaft of said latch plate;
   wherein the fixing system further comprises:
   a locking member mounted in a slidable and linearly movable fashion for switching the meshed state of said round latch part at said latch plate;
   a locking housing for guiding the linear movement of the locking member;
   a support spring, mounted between the locking housing and said locking member, that resiliently supports said locking member while said locking member is retracted from said round latch part;
   a cam member that contacts with said locking member and moves in the direction perpendicular to the moving direction of said locking member, thereby switching the meshed state between said locking member with said round latch part and a fluid pressure system for sliding the cam member;
   wherein the fluid pressure system comprises;
   a piston connected to said cam member via a rod;
   an air pressure cylinder mounted to guide the linear movement of the piston;
   an air pressure valve fitted with a solenoid actuator for supplying and discharging compressed air to and from the air pressure cylinder in response to an electrically manipulated signal; and
   a discharging spring mounted resiliently in the direction of said piston for discharging the air in the air pressure cylinder; and and
   a control system for controlling the manipulating system for a period of time according to the manipulation of an operation switch and an acceleration pedal, said control system comprising an electronic control unit (ECU).

* * * * *